United States Patent Office 2,818,342
Patented Dec. 31, 1957

2,818,342

NATURAL ORANGE CONCENTRATE AND ORANGE-MILK DRINK

Edward B. Ransom, Boston, Mass.

No Drawing. Application November 16, 1956
Serial No. 622,528

2 Claims. (Cl. 99—105)

This application is a continuation-in-part of my copending application Serial No. 290,817 filed May 29, 1952, now abandoned. The invention relates to a natural orange drink concentrate embodying orange juice and total peel ingredients including substantial portions of orange peel oil and pectin, released and extracted by comminuting and pressing the total orange pulp and peel, together with sugar in solution, and to a non-curdled and uniformly liquid smooth orange-milk drink made by mixing the concentrate with a major portion of sweet milk.

It is well known that orange juice and milk will not mix without curdling and, even though much effort has been expended to make a smooth and palatable orange-milk drink from these ingredients, no satisfactory solution has heretofore been found. The object sought is to produce an orange-milk drink that will combine the food elements of both ingredients without deterioration or change and impart full orange flavor to the drink. I have discovered that an orange concentrate including sugar in solution with fresh orange juice and substantial portions of orange peel oil and pectin, normally locked within the orange peel cells and the albedo, will readily combine with a major portion of sweet milk without curdling and furthermore, that the ingredients extracted from the total peel and albedo add superior keeping qualities to the concentrate and the orange-milk drink and aid in giving and maintaining uniformly smooth liquid body to the drink. The primary object of my invention resides in the production of a natural orange concentrate of this nature and in a natural orange-milk drink produced therefrom when mixed with sweet milk.

In proceeding with the production of the concentrate, I thoroughly wash and drain whole oranges and pass the whole oranges into and through a screw-type juicer having a relatively long barrel with liquid exit holes therealong and small pulp exit holes in the end plate, the juicer employed being specially constructed to perform the following functions. The juicer first crushes the whole oranges and squeezes out the primary juice and then continues to pass the peel and pulp along the grinding knives. During this passage through the juicer the total peel and pulp are comminuted by the knives to break up the cells and release substantial amounts of the contained oil and pectin. Pressure of the solid mass against the small hole perforated end plate thereupon highly compresses the mass sufficiently to express therefrom substantial portions of the oil and pectin released from the peel cells and albedo and total peel and pulp.

The coarse pulp is strained from the resulting liquid product and sufficient sugar is added to the liquid extract to give it body and aid in its preservation. The amount of sugar so added preferably approximates 25% to 30% of the extract, resulting in approximately five pounds of sugar to each gallon of the extract body. The five pounds of sugar approximates 50 ounces in solution and its addition to each gallon of extract results in approximately 178 ounces of the final product.

The final product is packaged in sealed tins, frozen and kept under refrigeration in the manner of frozen orange juice concentrate. It may also be packaged in glass or paper containers and frozen. As thus packaged it can be preserved indefinitely. If bottled or packaged in glass or paper containers, preferably glass, and kept under refrigeration of 38° to 45° F., the concentrate will retain its edible characteristics for periods approximating two to four weeks. When exposed at normal temperatures, the concentrate will remain edible for shorter periods, depending largely on the surrounding temperatures.

The concentrate is used by mixing one part thereof to a multiple parts major portion of sweet milk, preferably four parts of homogenized milk. The required amount of concentrate is merely added to the milk and thoroughly blended by shaking and/or stirring. The resulting product is a non-curdled orange-milk drink of highly palatable and nutritious quality, a six ounce tin being sufficient to make one quart of this drink. While the relatively large portion of concentrated peel oil and pectin present renders the concentrate bitter and unpalatable, the high potency of such factors serve the functions of preserving the concentrate and giving the desired orange flavor to the final orange-milk drink produced without requiring enough of the concentrate to effect curdling of the milk.

It is known that the acid in orange juice causes the objectionable coagulating and curdling of milk and the relatively large portion of orange juice required to give palatable orange flavor to milk contains sufficient acid to cause such curdling. My natural orange concentrate is of syrup-like consistency that requires dilution to become palatable and is so rich in orange peel oil that a relatively small amount mixed with milk is sufficient to produce a pleasing and fully orange flavored milk drink without introducing enough acid to accelerate the curdling of the milk. The relatively large portions of orange peel oil and pectin present in the concentrate aid substantially in preserving both the concentrate and the orange-milk drink, and the bitterness ingredient which comes from the albedo, and which is objectionable in orange juice, together with the natural pectin, also contribute substantially to the flavor and smooth character of my novel orange products.

Thus I have produced a natural orange concentrate adapted when diluted with major portions of sweet milk to produce a delicious and liquid-smooth orange-milk drink. The sugar solution together with the stabilizing action of the pectin furthermore aid in preserving the products and their desirable characteristics. It is also noted that, while the primary use at present contemplated for my natural orange concentrate is the production of the orange-milk drink, the concentrate may well have many other uses such as providing a natural orange flavoring ingredient for cakes and like food products.

The following experiments were carried out for the purpose of determining the amount of dilution required to prevent curdling when my concentrate is mixed with milk.

Two ounces of the concentrate was mixed with six ounces of homogenized milk (1 to 3) and no curdling resulted. Two ounces of the concentrate was mixed with four ounces of homogenized milk (1 to 2) and no curdling resulted. These ounces of the concentrate was mixed with four ounces of homogenized milk (3 to 4) and curdling immediately resulted. Four ounces of the concentrate was mixed with four ounces of homogenized milk (1 to 1) and curdling immediately resulted. Thus it appears that the dilution must comprise a multiple parts portion of milk (two or more) to one part of concentrate. I have found that the most satisfactory orange-milk drink is produced by using four parts of milk to one part of the concentrate.

A chemical analysis of the concentrate as above described has been made by Skinner & Sherman, Inc., chemists of Boston, Massachusetts, with the following results:

Sample #1

| | | |
|---|---|---|
| Total solids | percent | 46.20 |
| Soluble solids | do | 45.92 |
| Insoluble solids | do | 0.59 |
| Vitamin C | mg. per 100 gms | 41.7 |
| pH | | 3.7 |
| Titrable acidity as acetic acid | percent | 0.69 |
| Ether extractable oil | do | 1.22 |
| Pectic acid | do | 0.04 |

Sample #2

| | | |
|---|---|---|
| Pectin | percent | 1.35 |

Sample #1 comprised the said concentrate including the added sugar. No test was made in such analysis of the pectin contained and a further analysis for this purpose was requested. This test for pectin was made with Sample #2 comprising the liquid extract without the added sugar. A signed copy of the report of this analysis accompanies this application.

These chemists advised that the non-curdling of the milk in my orange-milk drink results from the relatively small amount of acid introduced, as stated above. The chemists furthermore advised that, from a purely chemical standpoint, the composition of the extract and concentrate would vary with the type of oranges juiced, with the season, and with the particular type of juicer employed; also that it would be prohibitively expensive to attempt to set up a further chemical specification for and analysis of the concentrate.

Having thus disclosed my invention what I claim as new and desire to secure by Letters Patent is:

1. A non-curdled and uniformly liquid smooth orange-milk drink comprising sweet milk and a substantially liquid natural orange concentrate embodying a composition of ingredients of whole oranges including fresh juice from the interior pulp and substantial portions of orange peel oil and pectin together with sugar in solution all intimately blended together, the milk comprising a multiple parts major portion of the orange-milk drink.

2. A substantially liquid concentrate extracted solely from fresh oranges together with sugar in solution and comprising fresh original single strength and unprocessed natural orange juice together with relatively large portions of peel oil and pectin released and extracted from the oranges by comminuting and highly compressing the total orange pulp, peel and albedo, the peel oil and pectin being present in the concentrate in preponderant amounts aiding in preserving the concentrate and rendering it potently strong in orange flavor and adapted to give natural orange flavor without coagulating and curdling and to maintain a uniformly smooth liquid body when mixed with a multiple parts portion of sweet milk, the peel oil and pectin together comprising at least two percent of the concentrate.

References Cited in the file of this patent

UNITED STATES PATENTS

| | | |
|---|---|---|
| 1,925,441 | Finley | Sept. 5, 1933 |
| 2,378,533 | Bering | June 19, 1945 |
| 2,614,048 | Wenzelberger | Oct. 14, 1952 |
| 2,696,440 | Ball | Dec. 7, 1954 |